[19] United States Patent
Cookson

[11] 4,352,949
[45] Oct. 5, 1982

[54] TRANSMISSION LINE INCLUDING SUPPORT MEANS WITH BARRIERS

[75] Inventor: Alan H. Cookson, Pittsburgh, Pa.

[73] Assignee: The United States of America as represented by the United States Department of Energy, Washington, D.C.

[21] Appl. No.: 70,582

[22] Filed: Aug. 29, 1979

[51] Int. Cl.³ .............................................. H01B 9/06
[52] U.S. Cl. ..................................... 174/27; 174/28; 174/99 R; 174/142
[58] Field of Search .................... 174/14 R, 16 B, 27, 174/28, 99 R, 99 B, 99 E, 111, 142

[56] References Cited

U.S. PATENT DOCUMENTS 220,954 10/1879 Atterbury ......................... 174/99 R
680,150 8/1901 Hultman ........................... 174/27 X
2,167,510 7/1939 Hobart ................................. 174/27

FOREIGN PATENT DOCUMENTS 1280762 7/1972 United Kingdom ................... 174/27

Primary Examiner—Laramie E. Askin
Attorney, Agent, or Firm—M. S. Yatsko

[57] ABSTRACT

A gas insulated transmission line includes an elongated outer sheath, a plurality of inner conductors disposed within and extending along the outer sheath, and an insulating gas which electrically insulates the inner conductors from the outer sheath. A support insulator insulatably supports the inner conductors within the outer sheath, with the support insulator comprising a main body portion including a plurality of legs extending to the outer sheath, and barrier portions which extend between the legs. The barrier portions have openings therein adjacent the main body portion through which the inner conductors extend.

10 Claims, 6 Drawing Figures

TRANSMISSION LINE INCLUDING SUPPORT MEANS WITH BARRIERS

GOVERNMENT CONTRACT

The Government has rights in this invention pursuant to Contract No. ET-78-C-01-2870 awarded by the United States Department of Energy.

BACKGROUND OF THE INVENTION

This invention relates generally to gas insulated transmission lines, and more particularly to support means for insulatably supporting the inner conductor within the outer sheath of the transmission line, which support means utilizes a barrier to prevent the migration of arc products and contamination past the support means.

Compressed gas insulated transmission lines are being used in an ever-increasing scale in recent years due to the desirability of increasing safety, their environmental acceptability, problems in acquiring right-of-way for overhead lines, higher power loads required by growing metropolitan areas and growing demands for electrical energy. Compressed gas insulated transmission lines installed to date have typically comprised a hollow outer sheath, an inner conductor within the sheath, a plurality of insulating spacers which support the conductor, and a compressed gas such as sulfur hexafluoride or the like in the sheath to insulate the inner conductor from the outer sheath. The typical assembly has been fabricated from relatively short sections of hollow cylindrical ducts or tubes into which the conductor and insulators are inserted. The assembly is usually completed in the factory, and the sections are welded or otherwise secured together in the field to form transmission lines. It is also known to provide a particle trap in compressed gas insulated transmission lines as is disclosed in the patent to Trump, U.S. Pat. No. 3,515,939. The particle trap of Trump is utilized to allow conducting or semiconducting particles which could adversely affect the breakdown voltage of the dielectric gas to move from locations where such particles would cause breakdowns to areas where the particles are deactivated.

One problem which has arisen in the use of such compressed gas insulated lines is that, occasionally, not all of the particles are captured in the particle traps, which sometimes may collect on the insulating spacer surfaces and initiate high voltage flashover. To decrease the probability of this happening, it is desirable that the spacer surface area upon which the particles could collect be made as small as possible. However, the use of such minimum-surface area spacers itself presents a problem; if a failure occurs in the line, arc products and other contamination particles may be generated, and these contamination particles and arc products can migrate from the section of the transmission line where the failure occurred to adjacent sections. This movement of arc products and contamination throughout the transmission line may then cause subsequent substantial damage. One manner of avoiding this problem is to use conical or disc spacers which substantially fill the cross-sectional area of the transmission line, and which block progress of contamination or arc products along the line. But the use of such spacers presents again the problem of having a large surface area upon which particles may collect and initiate flashover.

The above-described problems have been minimized by the use of two types of spacers within the gas insulated transmission line; a first spacer having minimum surface area, and a second spacer which substantially fills the cross-sectional area between the inner and outer electrical conductors. This is the concept taught and described in the patent to Cookson et al, U.S. Pat. No. 4,105,859. A new type of gas insulated transmission line is presently being investigated which is called flexible or semi-flexible gas insulated transmission lines. These types of transmission lines utilize a corrugated outer sheath and a flexible, to a degree, inner conductor to provide a degree of flexibility to the transmission line to enable it, for example, to change directions without the use of accessory equipment such as elbows. In these new types of transmission lines, the insulating spacers which are utilized to support the inner conductor, or conductors, within the outer sheath are typically of a low dielectric constant material, and are more closely spaced together than corresponding insulators in the rigid-type systems. For example, whereas in the rigid type system an insulator may be disposed every 20 feet, the flexible or semi-flexible transmission lines utilize insulators spaced on the order of 5 or 6 feet apart. Thus, as with the rigid system, the use of minimum-surface area insulators is encouraged, while the use of barrier-type insulators to prevent arc product migration is desirable. However, the conical or disc barrier-type insulators utilized in the rigid systems typically have an inferior flashover voltage characteristic when compared to the insulator utilized in the remainder of the transmission line. Thus, what is desirable is a novel type of barrier insulator which may be utilized in flexible or semi-flexible gas insulated transmission lines.

SUMMARY OF THE INVENTION

According to the teachings of this invention, an improved gas-insulated transmission line is provided which includes an elongated outer sheath having a plurality of inner conductors disposed within and extending along the outer sheath. An insulating gas electrically insulates the inner conductors from the outer sheath, and support means are provided for insulatably supporting the inner conductors in the outer sheath. The support means comprises a main body portion which includes a plurality of legs extending to the outer sheath, and barrier portions which extend between the legs. The barrier portions have openings therein which are adjacent to the main body portion, and the inner conductors extend through these barrier portion openings.

BRIEF DESCRIPTION OF THE DRAWINGS

Reference is now made to the description of the preferred embodiment, illustrated in the accompanying drawings, in which.

DESCRIPTION OF THE PREFERRED EMBODIMENTS

Figure 1:
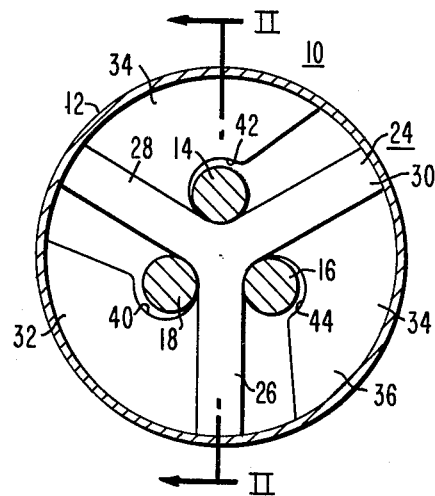
FIG. 1 is a cross-sectional view of a transmission line according to the teachings of this invention.
Figure 2:
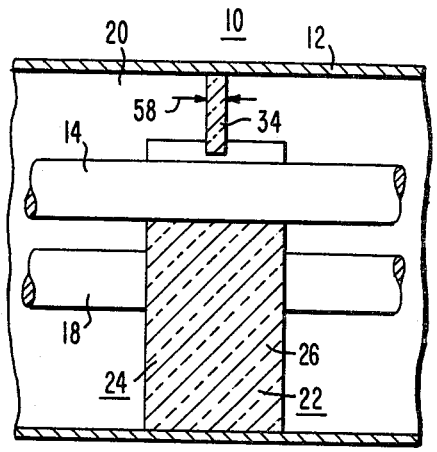
FIG. 2 is a sectional, elevational view taken along the line II—II of FIG. 1.

Referring now to FIGS. 1 and 2, therein is illustrated a gas insulated transmission line 10 according to the teachings of this invention. The transmission line 10 is comprised of an elongated outer sheath 12, typically of a good electrically-conducting material such as aluminum, and which may be cylindrical as illustrated, or may be corrugated. Disposed within the outer sheath 12 are a plurality of inner conductors 14, 16, 18 which are at the same electrical potential and which are utilized to transmit the electrical energy along the line. Disposed within the outer sheath 12, and electrically insulating the inner conductors 14, 16, 18 from the outer sheath 12 is an insulating gas 20 typical of which is sulfur hexafluoride or gaseous mixtures containing sulfur hexafluoride. Utilized to support the inner conductors 14, 16, 18 within the outer sheath 12 are support means 22, one of which is illustrated in FIG. 2, although within the transmission line numerous other insulating supports would typically be disposed. The support means 22 illustrated in FIGS. 1 and 2 comprise a main body portion 24 which includes a plurality of legs 26, 28, 30 which extend outwardly to the outer sheath 12, and barrier portions 32, 34, 36 which extend between the legs 26, 28, 30, respectively. The barrier portions 32, 34, 36 are relatively thin, that is, thin enough to stop passage of arc products or contamination but not necessarily sufficiently thick so as to be utilized for a support, and are molded with the main body portion 24 and substantially cover most of the open area between the electrical inner conductors 14, 16, and 18 and the outer sheath 12. The support means 22, including both the main body portion 24 and the barrier portions 32, 34, 36 would typically be of a low dielectric constant insulating material such as polypropylene.

Figure 4:
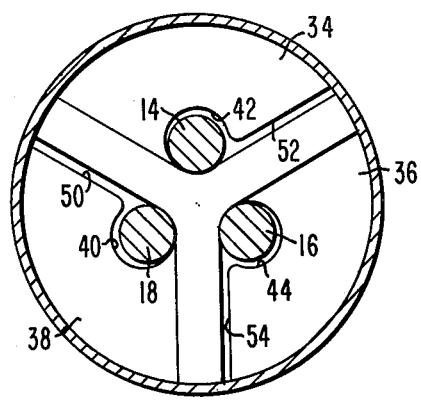
FIG. 4 is a cross-sectional view similar to FIG. 1 illustrating a further modification of the barrier portion of the support insulator.

As can be seen from the drawings, each barrier portion 32, 34, 36 has an opening 40, 42, 44 therein adjacent to the main body portion 24, and the inner conductors 14, 16, 18 extend through the openings 42, 44, 40, respectively. As illustrated in FIG. 1, the openings 40, 42, 44 extend to the outer sheath 12, so as to provide an insertion means for inserting the inner conductors 14, 16, 18 in the openings 42, 44, 40, respectively. If desired, as illustrated in FIG. 4, a plurality of slots 50, 52, 54 may extend from the openings 40, 42, 44, respectively, to the outer sheath to provide the insertion means. In this embodiment, the barrier portions 32, 34, 36 are capable of being deflected longitudinally to permit the inner conductors 14, 16, 18 to be inserted into the openings 42, 44, 40, respectively. By utilizing this embodiment illustrated in FIG. 4, there is less open area associated with each support means 22 through which arc products or contamination can migrate.

Figure 3:
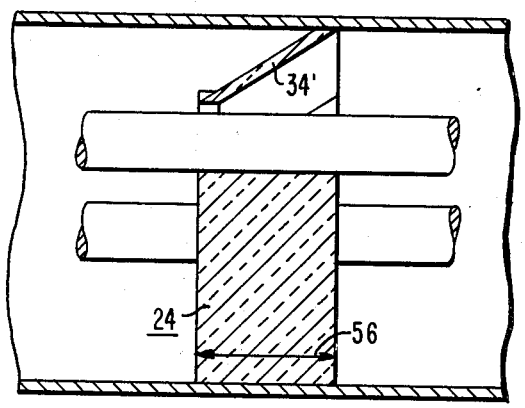
FIG. 3 is a view similar to FIG. 2 showing a modification of the barrier portion.

Referring to FIGS. 2 and 3, it can be seen that the main body portion 24 has a thickness 56 which extends in the longitudinal direction of the transmission line 10, and the barrier portions 34, for example, are of a second thickness 58 which is less than the thickness 56 of the main body portion 24. As illustrated in FIG. 2, the barrier portion 34 is disposed in the same plane as the main body portion 24, whereas in FIG. 3, the barrier portion 34' extends longitudinally at an angle to the main body portion 24. The advantage of disposing the barrier portion 34' at an angle to the main body portion 24 is that the field along the barrier surface will be lower and less susceptible to contamination. In conjunction with the fact that the barrier portion 34' is very thin, a result is a very low increase in the field at the inner conductor surface beneath the barrier portion 34'. The field increase with the barrier portion 34' slanted at an angle should be only a few percent.

Figure 5:
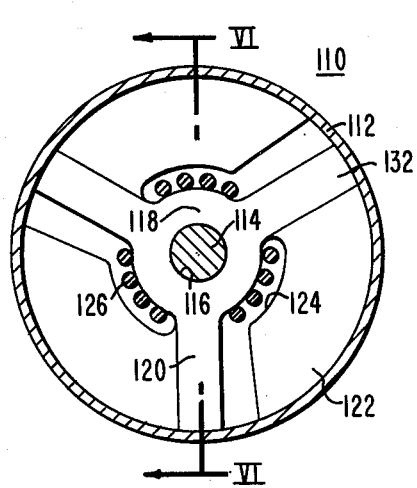
FIG. 5 is a cross-sectional view similar to FIG. 1 illustrating a further modification of the transmission line illustrated therein.
Figure 6:
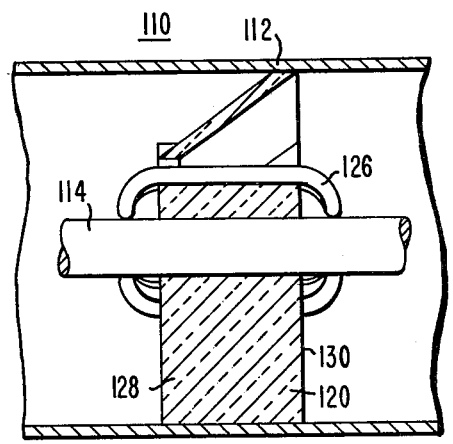
FIG. 6 is a sectional, elevational view taken along the line VI—VI of FIG. 5.

Referring now to FIGS. 5 and 6, therein is illustrated a modification to the transmission line 10 illustrated in the preceding figures. In this modification, the transmission line 110 includes an outer sheath 112 similar to the outer sheath 12 illustrated in FIG. 1, in that it may be smoothly cylindrical or corrugated as desired. In this modification, though, the current carrying conductor 114 is a single conductor which extends through a centrally disposed bore 116 of the main body portion 118 of the support means 120. As before, the support means 120 include barrier portions 122 each having openings 124 therein adjacent the main body portion 118. However, in this modification, disposed within the barrier portion openings 124 are a plurality of shielding conductors 126 which, as shown more distinctly in FIG. 6, extend through the barrier portions openings 124 and are in electrical contact with the inner conductor 114 on at least one longitudinal side 128, 130 of the support means 120. The shielding conductors 126 shield the area where the main current carrying conductor 114 is in contact with the insulator support means 120. The shielding conductors 126 do not carry load current, but instead only carry their own capacitive current. As before, the barrier portions 122 have little effect on the voltage distribution along the legs 132 which extend from the main body portion 118 to the outer sheath 112, and yet these barrier portions 122 can be used to prevent major passage of gas contamination produced from any fault.

I claim as my invention:
1. A gas-insulated transmission line comprising:
   an elongated outer sheath made of an electrically-conducting material;
   a plurality of inner conductors disposed within and extending along said outer sheath;
   an insulating gas comprising sulfur hexafluoride electrically insulating said inner conductors from said outer sheath; and
   support means for insulatably supporting said inner conductors in said outer sheath, said support means being made of a low dielectric constant material and comprising:
   a main body portion including a plurality of legs extending to said outer sheath; and
   barrier portions extending between said legs, said barrier portions having openings therein, adjacent said main body portion, through which said inner conductors extend;
   said main body portion including said plurality of legs being of a first longitudinal thickness and said barrier portions being of a second longitudinal thickness less than said first longitudinal thickness.
2. The transmission line according to claim 1 wherein said support means includes insertion means for inserting said inner conductors in said barrier portions openings.
3. The transmission line according to claim 2 wherein said insertion means comprises said barrier portions openings extending to said outer sheath.
4. The transmission line according to claim 2 wherein said insertion means comprises said barrier portions having slots therein extending from said barrier portions openings to said outer sheath, said barrier portions capa- ble of being deflected to permit said inner conductors to be inserted in said barrier portions openings.

5. A gas-insulated transmission line comprising:

an elongated outer sheath;

an inner conductor disposed within said outer sheath;

an insulating gas electrically insulating said inner conductor from said outer sheath;

support means for insulatably supporting said inner conductor within said outer sheath, said support means comprising a main body portion including a central section having a bore therethrough through which said inner conductor extends and a plurality of legs extending to said outer sheath, and barrier portions extending between said legs, said barrier portions each having an opening therein adjacent said main body portion; and a plurality of shielding conductors extending through said barrier portions openings and in electric contact with said inner conductor on one longitudinal side of said support means.

6. The transmission line according to claim 5 wherein said main body portion is of a first thickness and said barrier portions are of a second thickness less than said first thickness.

7. The transmission line according to claim 6 wherein said barrier portions extend longitudinally at an angle to said main body portion.

8. The transmission line according to claim 5 wherein said main body portion and said barrier portions are comprised of a low dielectric constant material.

9. The transmission line according to claim 5 wherein said support means includes insertion means for inserting said shielding conductors in said barrier portions openings.

10. The transmission line according to claim 9 wherein said insertion means comprises said barrier portions openings extending to said outer sheath.

* * * * *